US012629317B1

(12) United States Patent
Ziegler

(10) Patent No.: US 12,629,317 B1
(45) Date of Patent: May 19, 2026

(54) PRESSURE RELEASE THERAPY DEVICE FOR LATERAL AND MEDIAL EPICONDYLITIS

(71) Applicant: Dustin Ziegler, Butler, PA (US)

(72) Inventor: Dustin Ziegler, Butler, PA (US)

( * ) Notice: Subject to any disclaimer, the term of this patent is extended or adjusted under 35 U.S.C. 154(b) by 62 days.

(21) Appl. No.: 18/972,333

(22) Filed: Dec. 6, 2024

Related U.S. Application Data

(63) Continuation-in-part of application No. 17/699,367, filed on Mar. 21, 2022, now abandoned.

(60) Provisional application No. 63/164,591, filed on Mar. 23, 2021.

(51) Int. Cl.
*A61H 39/04* (2006.01)

(52) U.S. Cl.
CPC ....... *A61H 39/04* (2013.01); *A61H 2201/165* (2013.01); *A61H 2201/1695* (2013.01); *A61H 2205/06* (2013.01)

(58) Field of Classification Search
CPC .............. A61B 17/1325; A61B 17/132; A61B 17/1322; A61H 11/00; A61H 2011/005; A61H 1/008; A61H 2201/1695; A61H 2201/1635; A61H 7/001; A61H 39/04; A61H 2205/065; A61H 2205/067
See application file for complete search history.

(56) References Cited

U.S. PATENT DOCUMENTS 5,695,520 A * 12/1997 Bruckner .............. A61H 39/04 606/204

* cited by examiner

*Primary Examiner* — Majid Jamialahmadi
(74) *Attorney, Agent, or Firm* — Karen Tang-Wai Sutton

(57) ABSTRACT

A pressure release therapy device for pain relief and treatment of lateral and medial epicondylitis. The device is comprised of a rigid body having a main arch and an inverted secondary arch formed into the main arch, with a pair of flanges extending outwardly from the ends of the main arch, each flange formed with a slot adapted to receive an adjustable, elastic strap. An apex of the inverted secondary arch forms a pressure bar extending into an area below the main arch, the pressure bar having a uniformly linear profile and adapted to be positioned against a user's forearm. A method of use is also provided.

10 Claims, 8 Drawing Sheets

PRESSURE RELEASE THERAPY DEVICE FOR LATERAL AND MEDIAL EPICONDYLITIS

CROSS-REFERENCE TO RELATED APPLICATIONS

This application claims benefit of U.S. patent application Ser. No. 17/699,367 filed on 21 Mar. 2022 which itself claims priority and benefit to provisional U.S. patent application Ser. No. 63/164,591 filed on 23 Mar. 2021, both applications in and which in its entirety is incorporated by reference into this application.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The present invention pertains to the field of physical therapy devices for human use. Specifically, the invention is an off-the-shelf, universal pressure release therapy device for treating lateral epicondylitis and medial epicondylitis, commonly known as tennis elbow and golfer's elbow.

Background Art

Lateral epicondylitis, commonly known as tennis elbow, and medial epicondylitis, commonly known as golfer's elbow, are painful conditions commonly associated with tennis, golf, fencing, and many other sports, as well as with people working in carpentry, cooking, painting, and plumbing. Repetitive motion over long periods of time often cause pain and inflammation of the tendons joining the forearm muscles on the outside of the elbow joint, leading to lasting pain and tenderness at the region outside the elbow area, although this condition can also arise unexpectedly without any known cause.

Symptoms appear gradually, where mild discomfort becomes mild pain and then severe pain over weeks and months. Many sufferers seek treatment only when the pain is severe and unbearable, as the gradual nature of the symptoms is such that the sufferer fails to realize the significance of the injury when mild discomfort first begins.

Tennis elbow is treated with surgery, cortisone shots, and rest, but studies show that up to 95% will resolve without surgical intervention provided the patient sufficiently rests the elbow joint to allow the inflamed tendons to heal.

The main problem with medial and lateral epicondylitis is that these conditions are slow to heal. Since symptoms worsened with forearm activity, patients are encouraged to rest their afflicted elbows as much as possible, but it is impossible not to use the forearms for months on end. Hence, along with physical therapy and anti-inflammatory medications, patients are often given an elbow brace to wear around the forearm to support the tendons and relieve symptoms.

Current off-the-shelf, non-customized elbow braces feature a non-elasticized arm band, typically adjustable with hook and loop closures or other adjustable fastening methods, with a small air pillow attached to the band. In some embodiments, the air pillow is a gel pillow or other fluid-filled sac. The pillow is positioned on the back of the forearm below the elbow joint to treat lateral epicondylitis, and along the inner forearm below the elbow joint to treat medial epicondylitis. The pillow cushions the sore tendons and together with the non-elasticized arm band, in theory create a new pressure point or pivot point for the forearm muscles along the band area, allowing use of the arm while the sore attachment point at the elbow rests. Other elbow braces are snug-fitting sleeves with limited elastic properties designed to compress the arm and otherwise limit its use or provide some additional support by providing some negative feedback when the arm is used through discomfort by the sleeve tightening around the muscles. These braces may be made of elastic material such as neoprene, but to be effective, they have limited stretch since they must apply constant pressure to the entire perimeter of the arm and discourage arm use to allow healing to occur, such as in U.S. publication no. 2014/0188024 A1 to Cox, an off-the-shelf device with a tight band. More commonly, customized elbow braces are made according to the method in U.S. patent no. 4, 299, 214 to Sweitzer where a customized elbow brace for specific individual patients are cast directly onto their forearms at the physicians' offices. For devices using a pillow, the pillow tends to rotate and displace, further exposing the painful area to bumping and causing even more pain in the joint. Pillow size must be weighed against bulk and convenience, with larger pillows offering greater comfort to the elbow but the bulk is inconvenient and may interfere with clothing. The pillows must again be secured using a tight strap that discourages arm use.

What is needed is a new, off-the-shelf elbow brace to treat both lateral and medial epicondylitis that offers greater comfort and support with a smaller overall profile and weight as compared to the prior art to maximize wear convenience. What is also needed is a new off-the-shelf elbow brace that allows greater use of the forearm while still allowing sore tendons to rest and heal. What is finally needed is a new off-the-shelf universal elbow brace that is cost effective.

DISCLOSURE OF INVENTION

A pressure release device and method of use for treating lateral epicondylitis and medial epicondylitis are disclosed. The pressure release device comprises a rigid body having a main arch and an inverted secondary arch formed into the main arch, the body positioned on a forearm of a user with an adjustable, elastic strap. The main arch is formed with a pair of flanges extending outwardly from a first end and a second end of the main arch, with a main arch length between the first and second ends defining a curved top surface and a curved bottom surface. Each flange is formed with a slot adapted to receive the strap. The main arch features a main arch apex centered between the first and second ends and a main arch area between the first and second ends and the curved bottom surface. The secondary arch has a proximal end and a distal end with a secondary arch length between the proximal and distal ends defining a curved inner surface and a curved outer surface of the secondary arch. This curved outer surface includes a secondary arch apex which serves as a pressure bar 18 when positioned against a forearm of a user. The main arch and the secondary arch each have a linear span measurement, the main span measured between the first and second ends and the secondary span measured between the proximal and distal ends of the secondary arch, with the main span oriented perpendicular to the secondary span. Looking at the FIGS., for the main arch, the main span has a span measurement that is greater than a width dimension, and in contrast, for the secondary arch, a width dimension of the secondary arch 16 is greater than the span measurement of the secondary span. Each of the main arch and the secondary arch has an area, and the area of the inverted secondary arch encroaches into the area of the main arch, such that when the pressure release device is positioned on the forearm of a user, the area of the main arch faces the forearm of the user and the area of the secondary arch faces upwards, opposite that of the area of the main arch. The secondary arch apex centered between the proximal and distal ends has an approximately U-shaped uniform linear profile and serves as a pressure bar adapted to be positioned against the forearm of the user. In some embodiments, the secondary arch apex is flattened. The rigid body in some embodiments is made of a material selected from the group consisting of wood, plastic, and metal.

The strap of the pressure release device is an elastic material comprising rubber, latex or both rubber and latex and may further be comprised of other elastic materials such as nylon and spandex and that is either woven, braided or knitted together. The strap has a strap original length and a strap stretched length, the strap stretched length being up to 55% longer than the strap original length. An adjustment end of the strap is formed with a first coupler on the strap length, the first coupler mateable to a second coupler positioned along the strap length or formed into the strap.

The method of use of the pressure release device for treating lateral or medial epicondylitis around an elbow joint of a user comprises the steps of identifying a pain point on one of the inner side and outer side of the elbow of the user, positioning the adjustable strap of the pressure release device over a forearm of the user below the identified pain point and just below the elbow joint, positioning the secondary arch apex to a same side as the pain point and across the forearm perpendicular to the direction of the muscles and tendons of the forearm, tightening the strap to create comfortable pressure against the forearm so as to press the secondary arch apex firmly against the forearm, and securing the adjustment end of the strap by coupling the first and second couplers.

In a first aspect of the method according to the invention, to treat lateral epicondylitis, the secondary arch apex is positioned on an outside portion of the forearm for treatment of lateral epicondylitis. To treat medial epicondylitis, the secondary arch apex is positioned on an inside portion of the forearm.

In yet another aspect of the method according to the invention, the method further comprises the steps of evaluating the perceived pain of the user and repeating the steps of positioning, tightening, and securing after the step of securing if the user continues to perceive pain in the elbow joint.

BRIEF DESCRIPTION OF THE DRAWINGS

The features and advantages of the invention will become apparent from a consideration of the subsequent detailed description presented in connection with accompanying drawings, in which:

FIG. 10 is a representation of a therapeutic position for the pressure release therapy device shown in FIG. 9, with a dashed line showing how the device affects the anatomy of the user's outer forearm.

DRAWINGS LIST OF REFERENCE NUMERALS

Figure 1:
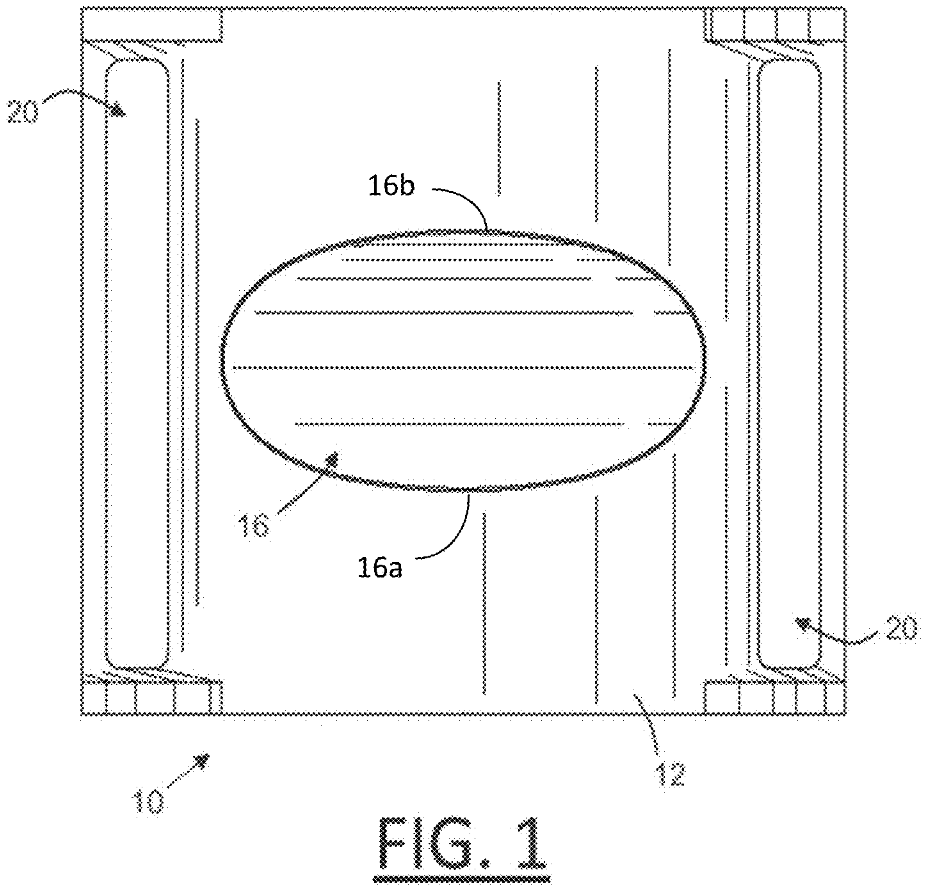
FIG. 1 is a top view of a body portion of a pressure release therapy device according to the invention.
Figure 2:
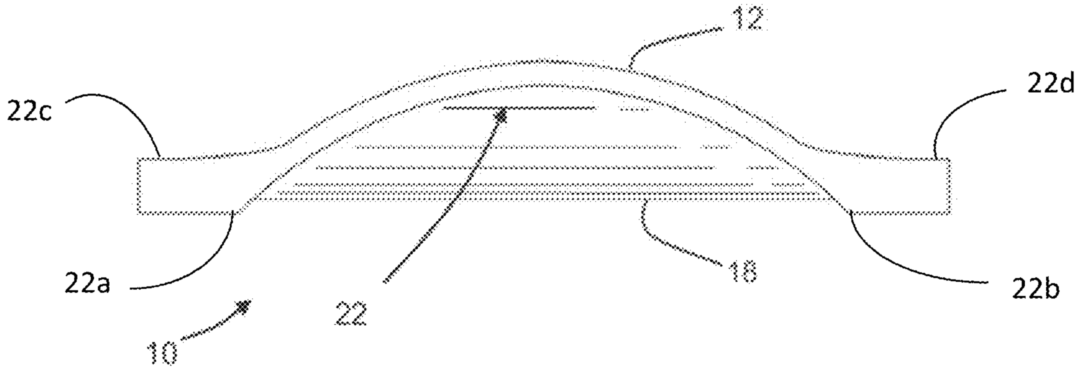
FIG. 2 is a side elevation view of the body in FIG. 1.
Figure 3:
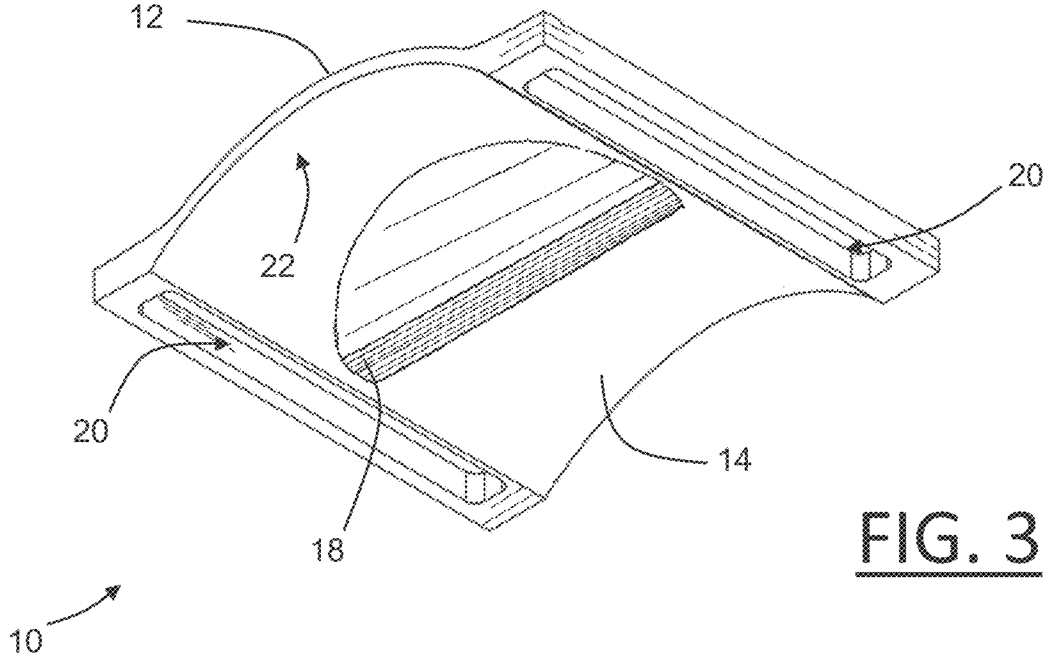
FIG. 3 is a bottom perspective view of the body in FIG. 1.
Figure 4:
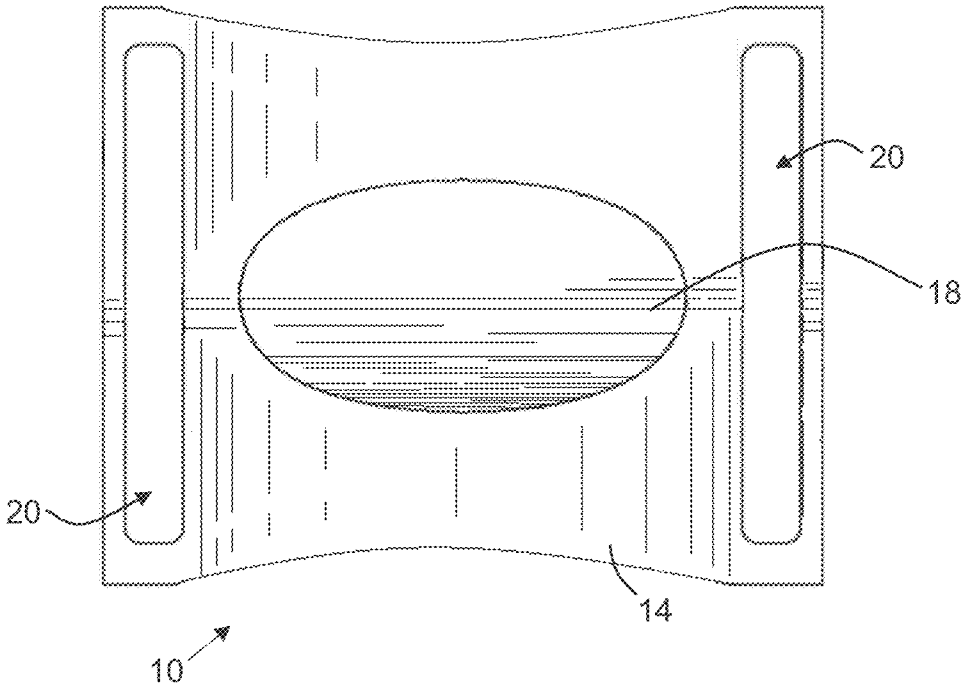
FIG. 4 is a bottom view of FIG. 1.
Figure 5:
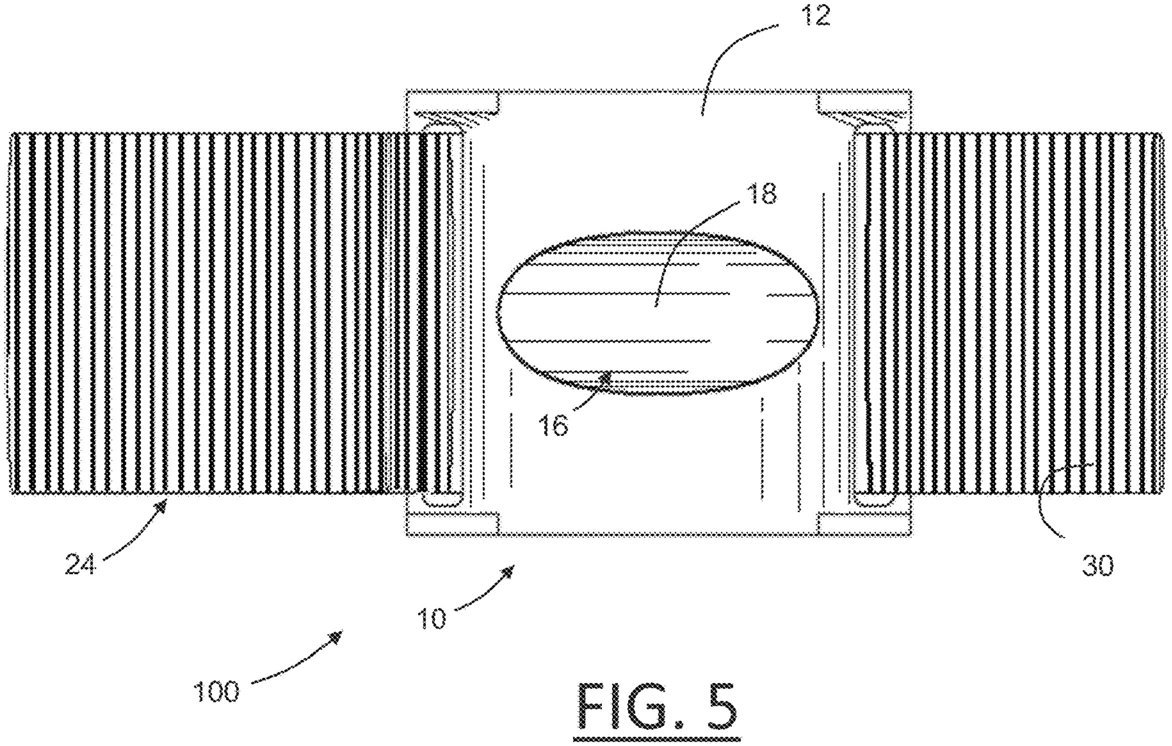
FIG. 5 is a top elevation view of the pressure release therapy device according to the invention, shown with an adjustable length band inserted into a pair of slots of the body.
Figure 6:
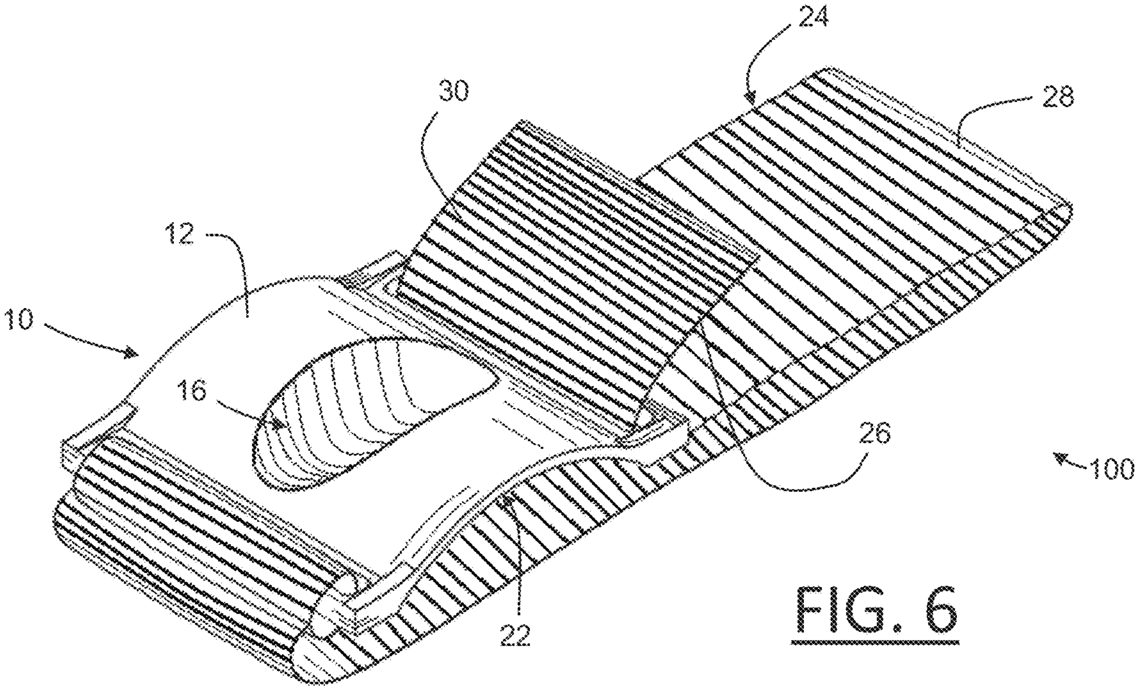
FIG. 6 is a first perspective view of the pressure release therapy device in FIG. 6, shown with an adjustment end of the adjustable length band in a ready to secure position, and with the pressure release therapy device resting against a flat surface.
Figure 7:
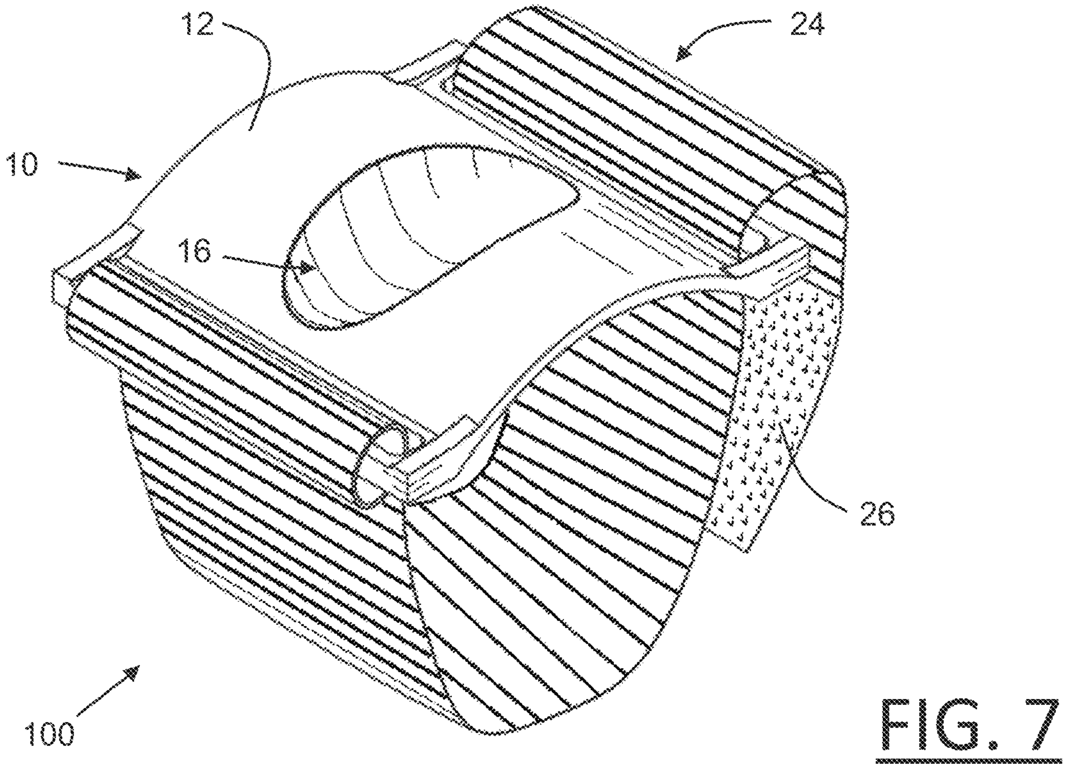
FIG. 7 is a second perspective view of the pressure release therapy device in FIG. 6, shown elevated and with the band forming a loop.
Figure 8:
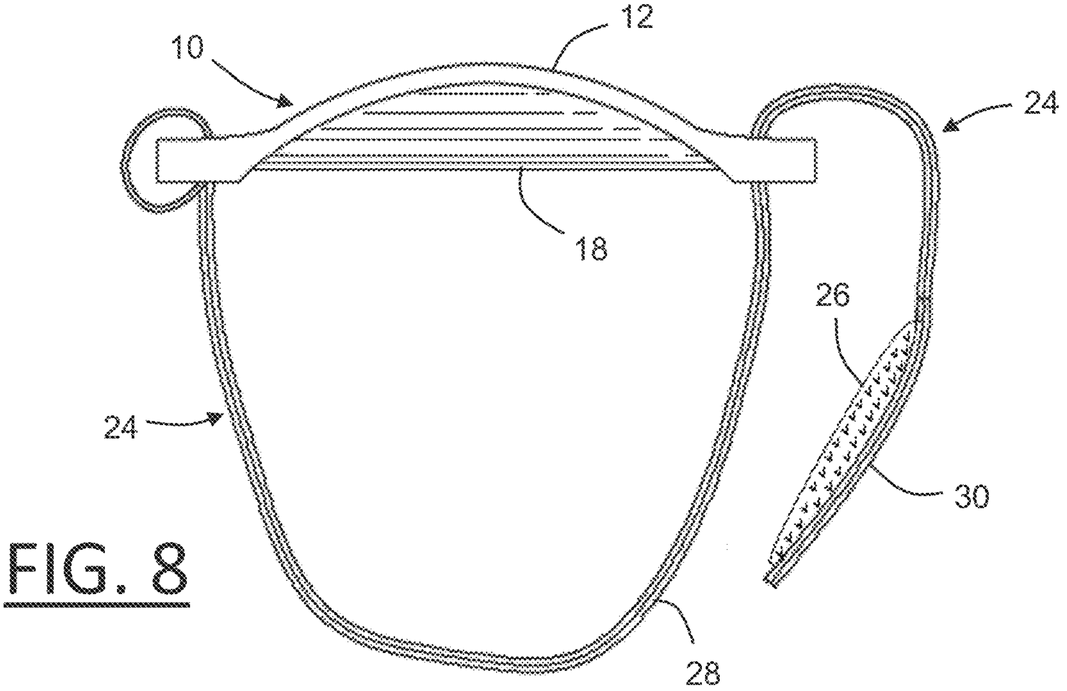
FIG. 8 is a side elevation view of the pressure release therapy device in FIG. 7.

The following is a list of reference labels used in the drawings to label components of different embodiments of the invention, and the names of the indicated components.

100 pressure release therapy device or device
10 body
12 top
14 bottom

16 secondary arch
16*a* proximal end of secondary arch
16*b* distal end of secondary arch
18 pressure bar or secondary arch apex or secondary apex
20 slot
22 main arch
22*a* first end of main arch
22*b* second end of main arch
22*c* first flange
22*d* second flange
24 band or strap
26 hook fastener
28 loop fastener
30 adjustment end
40 user
42 outer arm
44 inner arm
46 inflamed tendons
48 pain point
50 lateral epicondyle treatment suggested position
50*a* lateral epicondyle
51 medial epicondyle treatment suggested position
51*a* medial epicondyle
52 extensor muscles
54 bicep muscle
56 humerus
58 flexor muscles
60 new strain point

DETAILED DESCRIPTION

Figure 9:
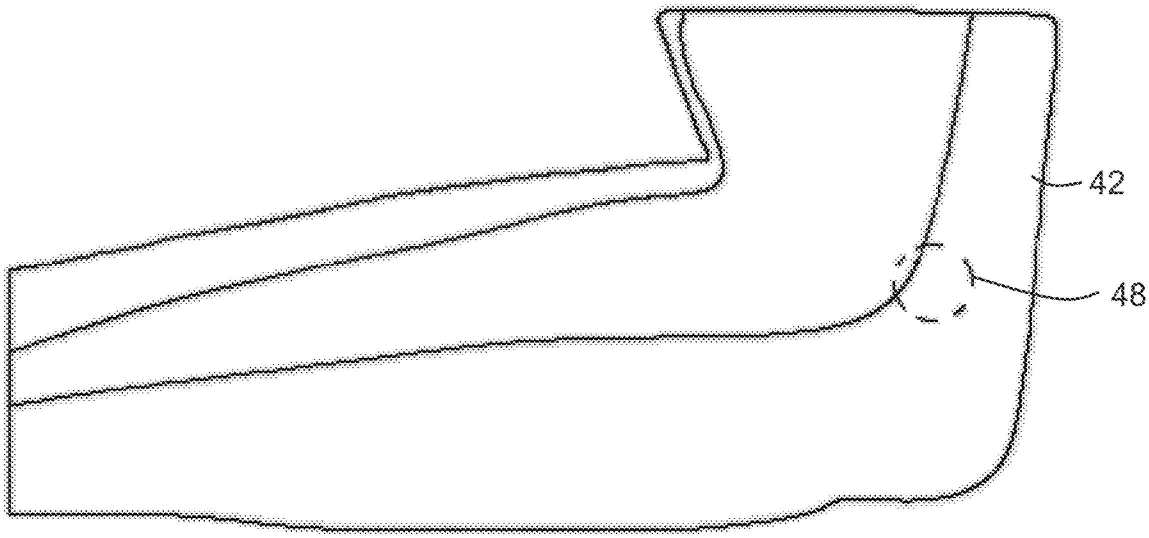
FIGS. 9 and 10 are representations of a user's arm and anatomy for lateral epicondylitis, with FIG. 9 showing an exterior facing forearm and elbow of the user and an approximation of a pain point, with FIG. 10 showing an anatomical and a suggested position of the pressure release therapy device across tendons and/or muscles of the upper forearm near an elbow of the user.
Figure 10:
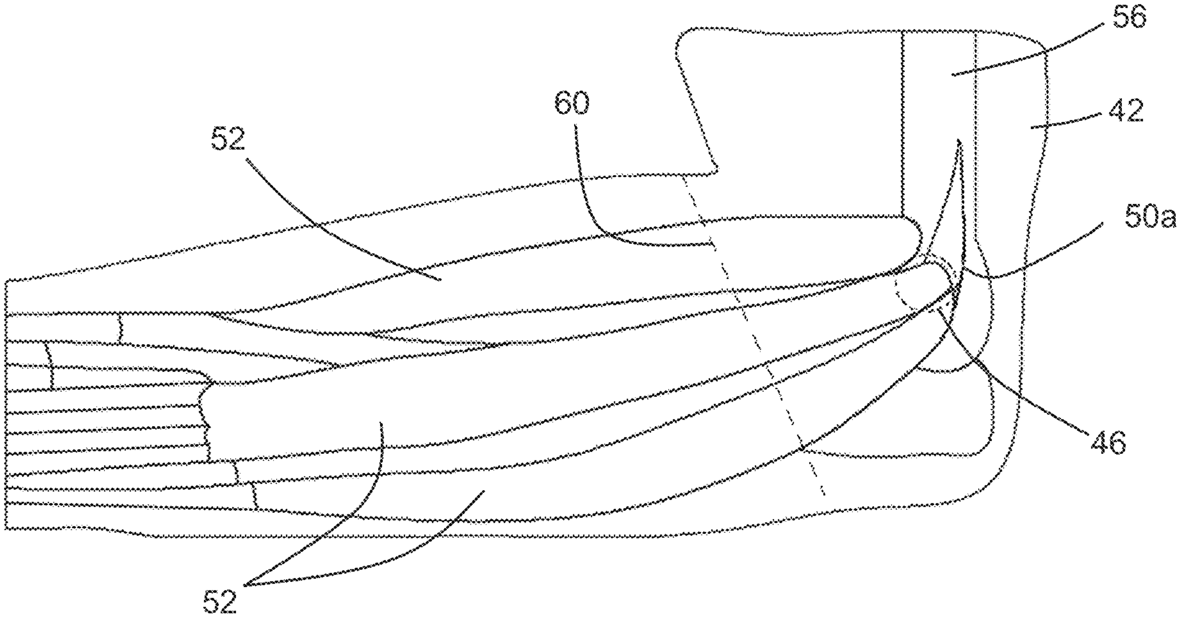
Figure 11:
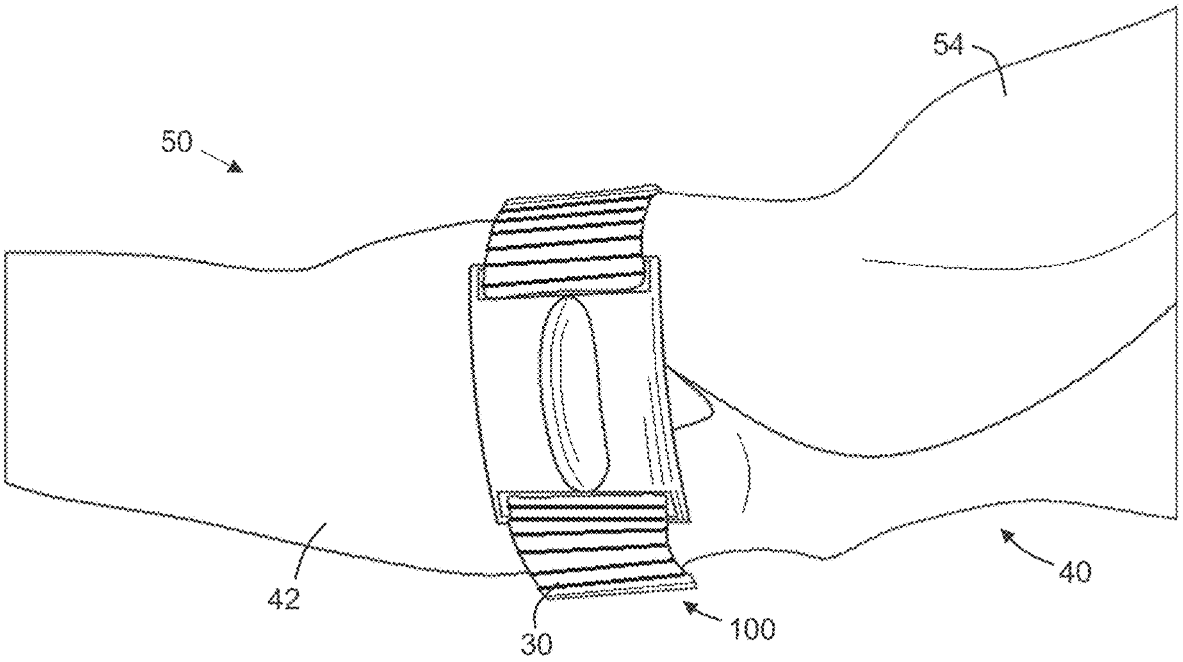
FIG. 11 is a representation of the user's outer forearm with the pressure release therapy device positioned as per FIG. 10.
Figure 12:
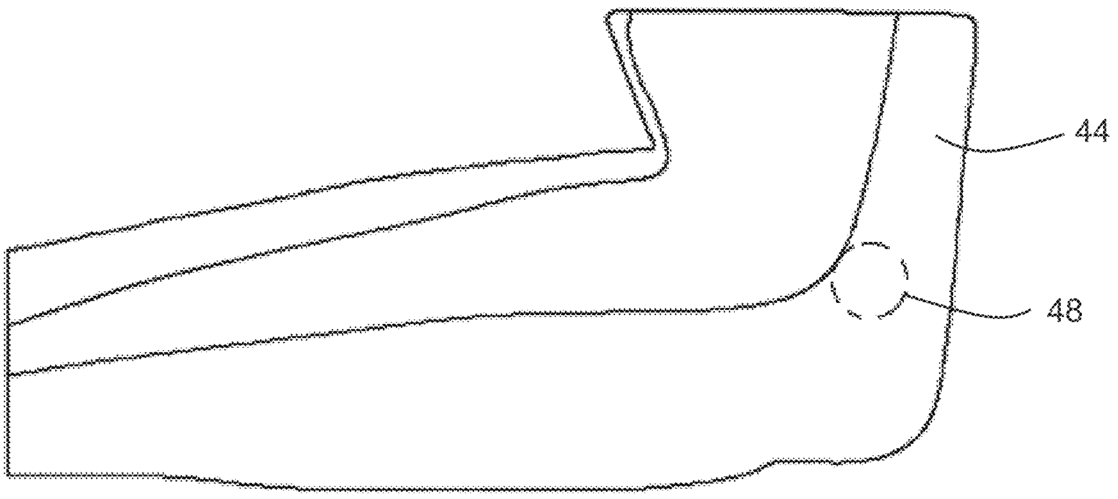
FIGS. 12 to 13 are representations of the user's inner forearm and anatomy for medial epicondylitis, with FIG. 12 showing an inner facing forearm and elbow with an approximation of the pain point, and with FIG. 13 showing the anatomical and suggested position of the pressure release therapy device across tendons and/or muscles of the upper forearm near the elbow of the user.
Figure 13:
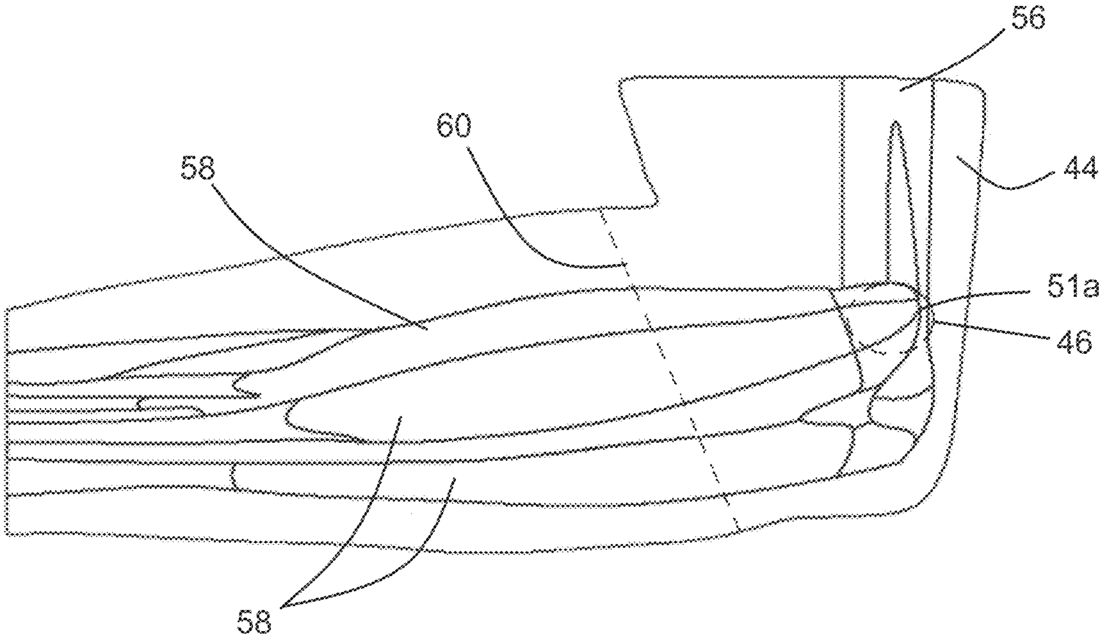
Figure 14:
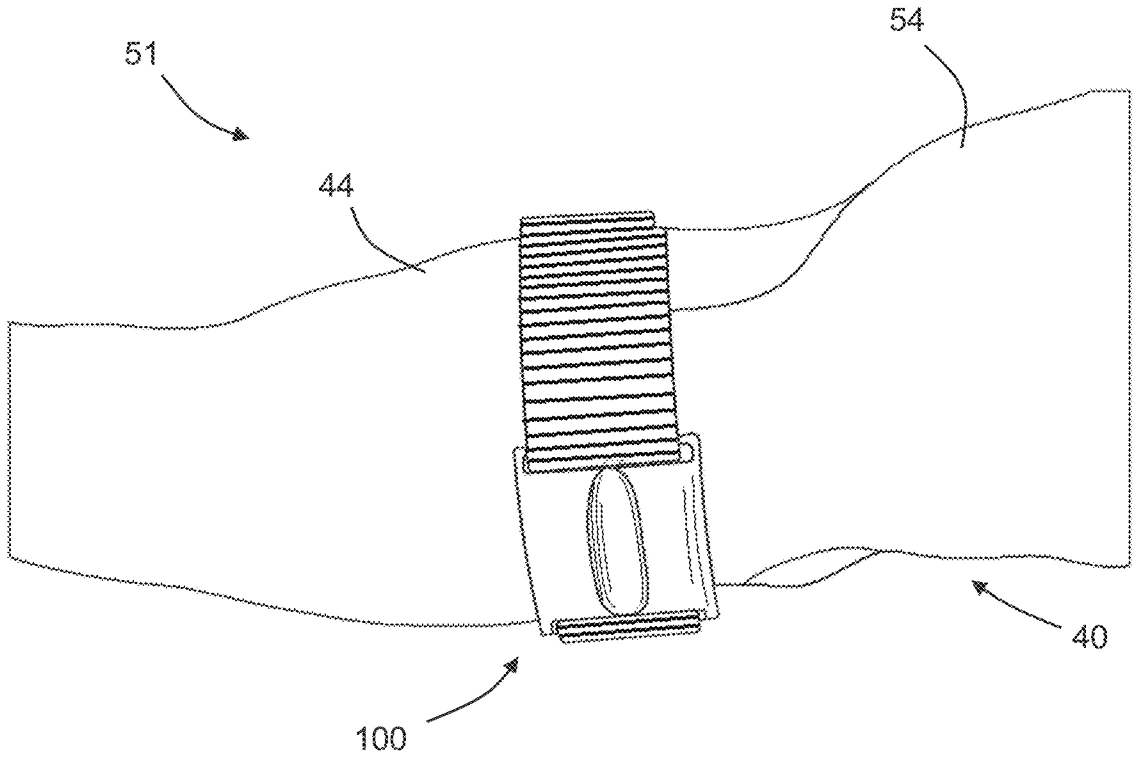
FIG. 14 is a representation of the user's inner forearm with the pressure release therapy device positioned as per FIG. 13.

A pressure release therapy device according to the invention or device 100 has an arched body 10 shown in FIGS. 1-4, with the body 10 and its strap 24 in FIGS. 5-8, with FIGS. 9-11 showing a suggested use of the device 100 for treatment of lateral epicondylitis 50 and FIGS. 12-14 showing a suggested use of the device 100 for treatment of medial epicondylitis 51.

Turning to the FIGS., the body 10 has a rectangular perimeter comprising a main arch 22 with a first end 22*a*, an opposed second end 22*b*, and a pair of slots 20, with one slot of the pair of slots formed into a first flange 22*c* and a remaining slot of the pair of slots formed into second flange 22*d*, the flanges 22*c* 22*d* extending outwardly from their respective first and second end 22*a* 22*b* of the main arch 22. An inverted secondary arch 16 is formed into the main arch 22, effectively cutting the main arch 22 into a pair of arcs on either side of the secondary arch 16. In the embodiment shown in the FIGS., the flanges 22*c* 22*d* are optional and the slots 20 can instead be formed into the first and second ends 22*a* 22*b* of the main arch 22. A main span of the main arch 22 is a linear horizontal distance underneath the main arch 22 between the first and second ends 22*a* 22*b*, excluding the flanges 22*c* 22*d*.

The secondary arch 16 formed into the main arch 22 of the body 10 approximates a finger in size and shape, with a secondary arch span a linear measurement between a proximal end 16*a* and a distal end 16*b* of the secondary arch 16 that is perpendicular to the main span. The secondary arch 16 has a secondary length defining a curved inner side that faces upwards when the device 100 is positioned on a forearm of a user, and a smooth uniform outer side protruding down into an area under the main arch 22, with an apex of the secondary arch or secondary apex along this outer side forming a pressure bar 18 on a bottom 14 of the body 10. In this disclosure, the terms "apex of the secondary arch" or "secondary apex" or "pressure bar" or "bar" are interchangeable and have a same meaning. The pressure bar 18 is shown most clearly in FIGS. 2 and 3. The FIGS. show a slightly flattened area along the secondary arch apex, that is, the pressure bar 18, however the inventor notes that a shape of the pressure bar 18 can range from a flattened "U" shape, as shown in the FIGS., to a curved "C" shape, with the more curved "C" shaping having a smaller relative pressure area when positioned against the forearm of the user. The pressure bar 18 has a uniform, linear profile to apply consistent pressure across the forearm of a user 40. Different shapes of the pressure bar 18 allow for adjustment of a pressure point area created when the device 100 is used. Since the pressure bar 18 shown in the FIGS. is in fact the apex of the upside down secondary arch 16 relative to the main arch 22, the intersecting, double arch design of the body 10 is most simply a pair of arches positioned so as to be perpendicular to one another and whose arches and areas under the arches intersect. Thus, a portion of the area under the secondary arch 16 and of the area under the main arch 22 are shared by the main and secondary arches 22 16. The intersecting main arch 22 and the secondary arch 16 thus result in a strong, lightweight structure. Further, removing material from an area under the secondary arch 16 of the pressure bar 18 streamlines the device 100, removing unnecessary weight and material without diminishing strength. The inventor notes that the arch design is universally understood as one of the strongest structures, thus having an empty space beneath the arch changes how the forces are distributed across the arch structure as compared to a solid structure where material fills the arch area. Other inventors have attempted to use linear, cylindrical structures such as what is shown in U.S. Publication no. 2014/0188024 A1 to Cox, or the bullet shaped structures positioned on each concave side of a pair of arches for treatment of carpal tunnel in U.S. Pat. No. 10,463,564 B2 to Chung et. al. that encircle the entire wrist when the device is in a use position, but these structures do not distribute force in a same way as the device 100 disclosed herein. The body 10 is made of a rigid, lightweight material, typically molded plastic, although any rigid material including metal, wood, and composite materials can be used. The inventor stresses that the intersecting, double arch design is a key feature of the invention as it provides strength and comfort for the user 40 without bulk or weight. The curved top 12 of the body 10, complementing a curve of a forearm of the user 40 and the downward force against the pressure bar 18 is transferred along the secondary arch 16 to its ends 16*a* 16*b* and then again redistributed by the main arch 22. The body 10 and pressure bar 18 ideally are manufactured as a single unit or piece.

The device 100 is further comprised of the adjustable band or strap 24 positioned through the slots 20, with an outermost surface of the strap 24 having a loop fastening covering 28, with an adjustment end 30 of the strap 24 having a hook fastening covering 26 facing the loop fastening covering 28. The strap 24 in the FIGS. suitable for use with the body 10 has elastic properties, specifically, is entirely or partly comprised of an elastic material that is woven, knitted, or braided that incorporates rubber and/or latex, and other flexible materials wrapped around the rubber and/or latex. The elastic material is configured as a strap with a length relatively longer than its width and must be capable of stretching in its lengthwise direction with minimal stretching capability through its width. The elastic material suitable for use as the strap 24 must have sufficient resiliency to maintain both a position of the body 10 and an efficacious amount of force on the pressure bar 18 regardless of whether the user's arm muscles are flexed or relaxed. To be clear, the elastic material according to the invention used for the strap 24 must be able to lengthen to accommodate the increased diameter of the flexed arm muscle and quickly rebound back to its original length when the muscle is relaxed many multiple times and over many hours of wear.

An example of a suitable elastic material for use as the strap 24 is the VELCRO® Brand VELSTRETCH® Elastic Loop, a woven elastic material made of nylon resin, rubber and Lycra® Spandex. This brand of elastic loop material can stretch up to 55% of its original length and offers both a soft woven edge and back for comfort with a durable loop face and is sold in rolls. This product is ideal for reusable medical applications such as the inventor's strap 24. There are many grades of woven or braided elastic material with many resiliency characteristics, and the inventor believes a flat woven or braided elastic material incorporating nylon and spandex with rubber and/or latex similar to the Velstretch® brand provides the needed resiliency for his strap 24. As previously mentioned, the strap 24 could be either an entirely elastic material or be a mostly non-elastic material with an elastic portion using materials as described herein. The inventor believes a hook and loop fastening system on the strap 24 works well, as shown in the representative embodiment in the FIGS., but the strap 24 could easily be adjusted and held in place using snaps, D-rings, or other known methods of fastening adjustable straps.

The inventor notes that there are many other types of elastic materials, such as neoprene and jersey knit that are unsuitable for use alone as the strap 24 as they either lack the ability to stretch enough to allow the arm muscles to flex, or lack the resiliency and force needed to ensure the bar 18 maintains consistent pressure and its location on the forearm of the user 40 as the arm muscles are flexed or relaxed. The woven, braided or knitted elastic materials suitable for use as the strap 24 or portions thereof are designed for specific uses as waistbands, cuffs, or straps, unlike neoprene or jersey knit from which entire garments such as wetsuits, shirts and pants are made. The amount of elasticity in these unsuitable yet elastic materials provides comfort but fails to apply a consistent, efficacious amount of pressure on the body 10 and thus on the pressure bar 18 if used as the strap 24 according to the invention. Neoprene is a type of synthetic rubber material with some elastic properties but is not suitable for use in the strap 24 according to the invention because it is unable to lengthen to the extent needed according to the invention and lacks the resiliency needed to maintain the consistent, efficacious pressure needed on the body 10.

The inventor notes that his invention is designed to be an off-the-shelf device, as opposed to a personally customized device such as made by the method disclosed in U.S. Pat. No. 4,299,234 to Sweitzer. The inventor's device 100 can be used on either arm, or by multiple family members of different sizes and ages, whereas the device in Sweitzer is specific to one person and to one arm only. The inventor emphasizes that Sweitzer's device, like the rest of the prior art, minimizes use of the arm. In contrast, the inventor's device 100 is specifically designed to allow the arm muscles of the user 40 to flex while still resting the original inflamed attachment point by purposely creating a new strain point 60. The prior art sometimes attempts to create this new strain point but relies primarily on the tight strap to limit arm use, so any new point created is somewhat moot because the strap or the rest of the device limits arm use, including the device made using Sweitzer's method. Medial and lateral epicondylitis are common recurring issues and many consumers prefer the lower cost and convenience of an off-the-shelf device as compared to the expense of a doctor visit and an expensive, customized device. The inventor's device 100 further allows the afflicted arm to be used while still resting the inflamed attachment point, whereas the prior art just rests the limb by restricting use.

The inventor notes that there are many off-the-shelf wrist braces for the treatment of carpal tunnel that use neoprene in conjunction with a hard insert, such as what is taught in U.S. Pat. No. 5,695,520 to Bruckner, and U.S. Pat. No. 10,463,564 to Chung, but the inventor notes that anatomically, the hand/wrist area does not significantly increase in diameter when the forearm muscles are flexed or the fingers are used. Neoprene may well provide enough support and stretch when used with the hard insert common in these specific applications, but the way in which hand and wrist braces work to relieve carpal tunnel syndrome is to limit flexing of the wrist, an action that does not change the diameter of the wrist or hand or stop the use of the hand/fingers. Thus, neoprene works well for these applications since the hard insert and the neoprene of the hand brace prevents flexing of the wrist but does not apply any significant pressure onto the hand/wrist so as to create a new attachment point for the muscles. The inventor notes that the hand and wrist area of the arm is very different from the forearm and elbow region of the arm, and thus solutions designed for one part of the arm cannot simply be moved up or down the arm to treat other areas due to significant anatomical differences.

The device 100 is used to treat both lateral epicondylitis 50 (so called "tennis elbow"), shown in FIGS. 9-11 and medial epicondylitis 51 (so called "golfer's elbow"), shown in FIGS. 11-14. For lateral epicondylitis, the user 40 positions the device 100 on the forearm of an afflicted elbow, with the arm contacting surface of the pressure bar 18, that is, the apex of the secondary arch 16, positioned on an outer forearm 42 and adjusted until the body 10 of the device 100 sits directly below the afflicted elbow of the user 40 as shown in FIGS. 9-10, where the suggested treatment location or strain point 60 for the pressure bar 18 is indicated by a dashed line in FIG. 10.

FIG. 11 shows the position of the device 100 as it would appear on the arm of the user 40. FIG. 9 shows a pain point 48, with FIG. 10 showing an inflamed area or inflamed tendons 46 and a location of a lateral epicondyle of the afflicted elbow. Note that the suggested new strain point 60 is below the pain point 48 and the pressure bar 18 is positioned at this new strain point 60. The adjustment end 30 is grasped and pulled through the slot 20, tightening the strap 24 until a comfortable pressure is reached, and then the hook and loop fasteners 26 28 are engaged to maintain the strap 24 position on the forearm.

The pressure bar 18, due to its position below the main arch 22, presses firmly below the inflamed tendons 46 in the lower arm, with the rigid pressure bar 18 creating the new strain point 60 across an uppermost end of a plurality of extensor muscles 52 and/or noninflamed ends of the inflamed tendons 46. The pressure bar 18 thus temporarily moves the strain point from the inflamed tendons 46 at the lateral epicondyle 50*a* to a new position on the forearm. The anatomical view of a human elbow in FIG. 9 shows a humerus 56, bicep 54, extensor muscles 52 and the inflamed tendons 46 at the lateral epicondyle 50*a*. Creating the new strain point 60 allows the actual tendon tissue attached at the lateral epicondyle 50*a* to rest and thus relieves stress on the tendons 46 while allowing the user 40 full use of the forearm.

For relief of medial epicondylitis 51, the user 40 positions the pressure bar 18 below the inflamed tendons 46 along an inner forearm 44 as shown in FIGS. 12-14, just below a pain point 48 corresponding with the inflamed tendons 46. The pressure bar 18 is again positioned to create the new strain point 60 across the upper end of a plurality of flexor muscles 58 and/or the noninflamed ends of the inflamed tendons 46 attached to the medial epicondyle 51*a*. The same method of adjusting and tightening the strap 24 as for the lateral epicondylitis is followed. FIG. 14 shows the device positioned on the user's inner forearm 44, to relieve pain from medial epicondylitis 51. Often in both lateral and medial epicondylitis 50 51, the user 40 feels instant pain relief when the device 100 is applied to the new strain point 60.

The inventor notes that his device 100 provides superior relief when compared to current braces because the device 100 exerts concentrated, uniform pressure specifically across the muscles and unaffected tendons rather than uniform pressure around the entire circumference of the arm. Hence, the strap 24 can be comfortably adjusted around the arm and the pressure bar 18 will maintain constant pressure at the new strain point 60 due to the double arch design of the device 100. Flexing the arm and thus stretching the strap 24 does not materially affect the efficacy of the pressure bar 18 and the arm can be used normally without further trauma to the inflamed tendons 46. The arched shape of the main arch of the body 10 conforms comfortably to a shape of the forearm and also provides strength to the body 10.

The inventor notes that the pressure bar 18 has an optimal width dimension being that which allows the pressure bar 18 to press firmly across and against all the forearm muscles 52 58 or tendons 46 or a combination of the forearm muscles 52 58 and tendons 46. Thus, the pressure bar 18 may be made provided in standard widths corresponding to different user forearm sizes in order to create a new temporary stress point. In the FIGS., the pressure bar 18 is approximately 2 inches long, with a bar length ranging being 1.5 to 2.5 inches. The inventor notes that current solutions that are used to treat lateral and medial epicondylitis are not sized specifically to account for the width of the user's tendons 46 and/or muscles 52 58 and that is a main reason why the prior art is not particularly useful treating these common and painful conditions. For the device 100, the bar 18 is sized and shaped to concentrate pressure so as to temporarily create the new stress point 60 to allow full and normal use of the arm muscles but still allow the original stress point to rest and heal much more quickly and with less pain as compared to the prior art.

In contrast, current brace solutions are often worn for a year or longer, while the user tries to slowly heal. Cortisone shots to the pain point 48 are also common. Orthopedic specialists caution these conditions are notoriously slow to heal and require at least six months to a year of rest while also acknowledging it is impractical to ask a person with the afflicted joint to refrain from using the arm for months at a time. Hence, the current standard of care and treatment is rest, not creating a new strain point on the arm and continued use of the arm.

The device 100 promotes fast healing with little downtime. In one test subject with lateral epicondylitis, marked improvement in perceived discomfort in the joint was reported within hours, with the tendons fully healed within six weeks. This test subject wore the device 100 continuously for several days, then intermittently during the day and at night, taking breaks from the device 100 without further pain or aggravation of the tendons. Another test subject, who had complained of chronic lateral epicondylitis for 2+ years obtained significant relief from pain wearing the device 100, again initially continuously for days, and later, just as he felt he needed extra support when engaging in his usual activities. This subject wore the device 100 for approximately 3 months before total resolution of the pain.

The inventor believes that his device 100 provides superior results due to its intersecting, double arch design, where the configuration of the opposed and intersecting arches provides superior strength and positioning of the pressure bar 18 that is otherwise not possible with devices such as what is taught by U.S. Pat. No. 5,695,520 to Bruckner et. al., that teaches a pressure tip on the wrist-facing side of an otherwise flat plate with a flexible band, or the device in Cox, U.S. publication no. 2014/0188024 teaching a pair of solid circular bars in space apart, parallel relationship positioned on a limb-facing side of an otherwise flat band teaching an embodiment using an additional flat plate on a non-limb-facing side of the circular bars. The Bruckner patent is for a device used on a wrist, and thus is silent on how the device can be modified to use on an upper arm where the issue of muscle flexing significantly and dynamically changing the diameter of the arm is a known issue. The device disclosed in the Cox publication fails to apply sufficient pressure to create an efficacious new attachment point on the arm as it relies on the tightness of the band to press the pressure bars into the user's limb and even if the band has some elastic properties, by the use of neoprene for instance, the band cannot both exert enough pressure on the pressure bar and yet have enough elasticity to accommodate flexing of the arm muscle while still being comfortable to wear. The cylindrical bars in Cox do not distribute force in a same way as the inventor's device 100 disclosed herein. Tightening the strap 24 puts downward pressure on the pressure bar 18 of the secondary arch 16, loading the secondary arch 16 and transferring the force from the pressure bar 18 to the proximal and distal ends 16*a* 16*b*, which then transfer the force to the apex of the main arch 22 and down to the first and second ends 22*a* 22*b* of the main arch 22 and to the strap 24. This kind of force redistribution is impossible with the devices taught in Cox or Chung or any other prior art and the inventor is unaware of any other device for the treatment of lateral or medial epicondylitis that uses this unique double arch design. Meanwhile, using neoprene just creates a tight, uncomfortably restrictive band if effective, or a comfortable, but ineffective band. In contrast, the intersecting, double arch design of the device 100 provides superior positioning and pressure on the pressure bar 18, while allowing the use of an elastic strap 24 for comfort and to allow normal arm use, which prior to the inventor's double arch design, has not shown to be useful in the prior art where the devices taught lack this unique intersecting, double arch design. This is why prior art bands for these devices have limited elastic properties, because it has long been recognized through use that such bands fail to exert sufficient pressure to create a new strain point and thus allow the inflamed attachment points to rest adequately. The inventor works with many patients struggling to heal lateral and medial epicondylitis and he is well aware of the problems with the prior art devices and their failure to address the ability to rest the inflamed attachment points of the limb while simultaneously allowing normal use of the limb. While some of the prior art devices, such as in Cox, look like they might be able to function the same way as the inventor's device 100, the double arch design provides superior results due to the strength and distribution of force by the arches working together in the body 10.

It is to be understood that the above-described arrangements are only illustrative of the application of the principles of the present invention. Numerous modifications and alternative arrangements may be devised by those skilled in the art without departing from the scope of the present invention. For instance, the device 100 is shown as being approximately rectangular, but the overall exterior shape could be oval or another shape for instance and not affect the efficacious performance of the design. In some applications, for instance in children who have relatively smaller and narrower arms, an oval, circular or square shape may be more comfortable, while maintaining the main arch 22 and the secondary arch 16 design of the body 10. The strap 24 could also be configured as a pair of straps independently attached to the first and second slots and then coupled using the hook and loop fastening system or other known fastening methods, including buckles used for belts or watches, snaps, hooks or other known useful fastening methods. The elastic material of the strap 24 allows the user 40 to snugly adjust the strap 24 while allowing arm use and comfort.

The top 12 along with the secondary arch area can also be adapted for use to conveniently apply heat or cold at the new strain point 60, if desired, with special inserts sized and shaped to fit into the area under the secondary arch 16 and be adhered to the top 12 by hook and loop fasteners, bands, or other suitable fasteners. Non-therapeutic uses for this area also exist, including identification or a place for information, personalization and even decoration, as desired. The inventor notes that the secondary arch area could also be configured as a hollow cylinder or rectangle and again allow a hot/cold insert or even serve as a storage area. The body 10 and even the pressure bar 18 could also be perforated to allow better air circulation for additional comfort without compromising the efficacy of the device 100. The inventor emphasizes the intersecting, double arch design is inherently strong and removing some of the material in the body 10 for air circulation by perforating the body 10 is unlikely to negatively affect performance, and can even improve weight and reduce material costs, a win for the consumer and manufacturer alike.

I claim:

1. A pressure release device for treating lateral epicondylitis and medial epicondylitis, comprising:
- a rigid body having a main arch and an inverted secondary arch formed into the main arch; and
- a strap;
- wherein the main arch further comprises:
- a first end and a second end with a main arch length between the first and second ends defining a curved top surface and a curved bottom surface;
- a first flange extending outwards from the first end and a second flange extending outwards from the second end, with a slot adapted to receive the strap formed into each of the first flange and the second flange;
- a main arch apex centered between the first and second ends;
- a main arch area between the first and second ends and the curved bottom surface;
- a main span having a linear main span measurement between the first end and the second end of the main arch;
- wherein the secondary arch further comprises:
- a proximal end and a distal end with a secondary arch length between the proximal and distal ends defining a curved inner surface and a curved outer surface of the secondary arch;
- a secondary arch apex centered between the proximal and distal ends having an approximately U-shaped uniform linear profile;
- wherein the curved outer surface of the secondary arch at the secondary arch apex is a pressure bar adapted to be positioned against a forearm of a user;
- a secondary arch area between the proximal and distal ends and the curved inner surface of the secondary arch;
- a secondary span having a linear secondary span measurement between the proximal and distal ends;
- wherein the secondary span of the secondary arch is perpendicular to the main arch span;
- wherein the secondary arch is formed centrally into the main arch apex such that the secondary arch area encroaches into and intersects with the main arch area, with the first and second ends of the main arch in opposed orientation with the proximal and distal ends of the secondary arch, such that the secondary arch area faces upwards when the main arch area faces downwards;
- wherein the secondary arch and the main arch are made of a same rigid material; and
- wherein the strap is further comprising:
- an elastic material comprising rubber, latex or both rubber and latex that is either woven, braided or knitted together;
- a strap original length and a strap stretched length, the strap stretched length being no more than 55% longer than the strap original length; and
- an adjustment end formed with a first coupler on the strap length, the first coupler mateable to a second coupler positioned along the strap length.

2. The pressure release device in claim 1, wherein the secondary arch apex is flattened.

3. The pressure release device in claim 1 wherein the rigid material is selected from the group of materials consisting of lightweight plastic, wood, and metal.

4. The pressure release device in claim 1, wherein the secondary arch further comprises a width having a measurement between 1.5 to 2.5 inches.

5. The pressure release device in claim 1, wherein the first and second couplers are hook and loop coupling materials, and wherein either the first coupler or the second coupler is the strap.

6. The pressure release device in claim 1, wherein the strap is comprised of a woven elastic material including rubber, nylon and spandex.

7. A method of using the pressure release device having the adjustable strap and the rigid body in claim 1 for treating lateral or medial epicondylitis around an elbow joint of a user, the elbow joint having an inner side and an outer side, the method comprising the steps of:
- identifying a pain point on one of the inner side and outer side of the elbow of the user;
- positioning the adjustable strap of the pressure release device over a forearm of the user below the identified pain point and just below the elbow joint;
- positioning the secondary arch apex to a same side as the pain point and across the forearm perpendicular to the direction of the muscles and tendons of the forearm;
- tightening the strap to create comfortable pressure against the forearm so as to press the secondary arch apex firmly against the forearm; and
- securing the adjustment end of the strap by coupling the first and second couplers.

8. The method in claim 7, wherein the secondary arch apex is positioned on an outside portion of the forearm for treatment of lateral epicondylitis.

9. The method in claim 7, wherein the secondary arch apex is positioned on an inside portion of the forearm for treatment of medial epicondylitis.

10. The method in claim 7, further comprising the step of:

evaluating the perceived pain of the user; and repeating the steps of positioning, tightening, and securing after the step of securing if the user continues to perceive pain in the elbow joint.

* * * * *